United States Patent [19]

Lingle

[11] Patent Number: 4,783,261
[45] Date of Patent: Nov. 8, 1988

[54] RIGID FILTER PLATE AND METHOD FOR PRODUCING SAME

[76] Inventor: E. Arnold Lingle, 445 Swamp Rabbit Rd., Leesville, S.C. 29070

[21] Appl. No.: 77,637

[22] Filed: Jul. 24, 1987

[51] Int. Cl.⁴ .............................................. B01D 39/20
[52] U.S. Cl. .................................... 210/290; 210/291; 210/504; 210/510.1
[58] Field of Search ............ 210/266, 291, 293, 510.1, 210/290, 503, 504

[56] References Cited

U.S. PATENT DOCUMENTS

| | | | |
|---|---|---|---|
| 2,732,078 | 1/1956 | Records | 210/293 X |
| 3,292,788 | 12/1966 | Schwarz | 210/291 X |
| 4,186,100 | 1/1980 | Mott | 210/510.1 X |
| 4,340,478 | 7/1982 | Stannard et al. | 210/293 X |
| 4,381,998 | 5/1983 | Roberts et al. | 210/510.1 X |
| 4,441,997 | 4/1984 | Fields | 210/291 X |
| 4,452,698 | 6/1984 | Roberts et al. | 210/510.1 X |
| 4,564,450 | 1/1986 | Piper et al. | 210/293 |
| 4,661,258 | 4/1987 | Phillips | 210/291 X |
| 4,689,150 | 8/1987 | Abe et al. | 210/510.1 X |
| 4,692,248 | 9/1987 | Stannard et al. | 210/510.1 X |

Primary Examiner—Robert Spitzer
Attorney, Agent, or Firm—B. Craig Killough

[57] ABSTRACT

An improved rigid filter plate for use in sludge dewatering or oil and water separation is characterized by a lower layer of relatively large material and an upper layer of relatively smaller material bonded thereto, with grains of sand interspersed within the upper layer and bonded to the material making up the upper layer. The device yields high efficacy in sludge dewatering and oil and water separation, while requiring a low level of cleaning and maintenance, yet is resistant to damage from mechanical cleaning when cleaning is necessary. An efficient and economical method of producing the device is also disclosed herein.

8 Claims, 2 Drawing Sheets

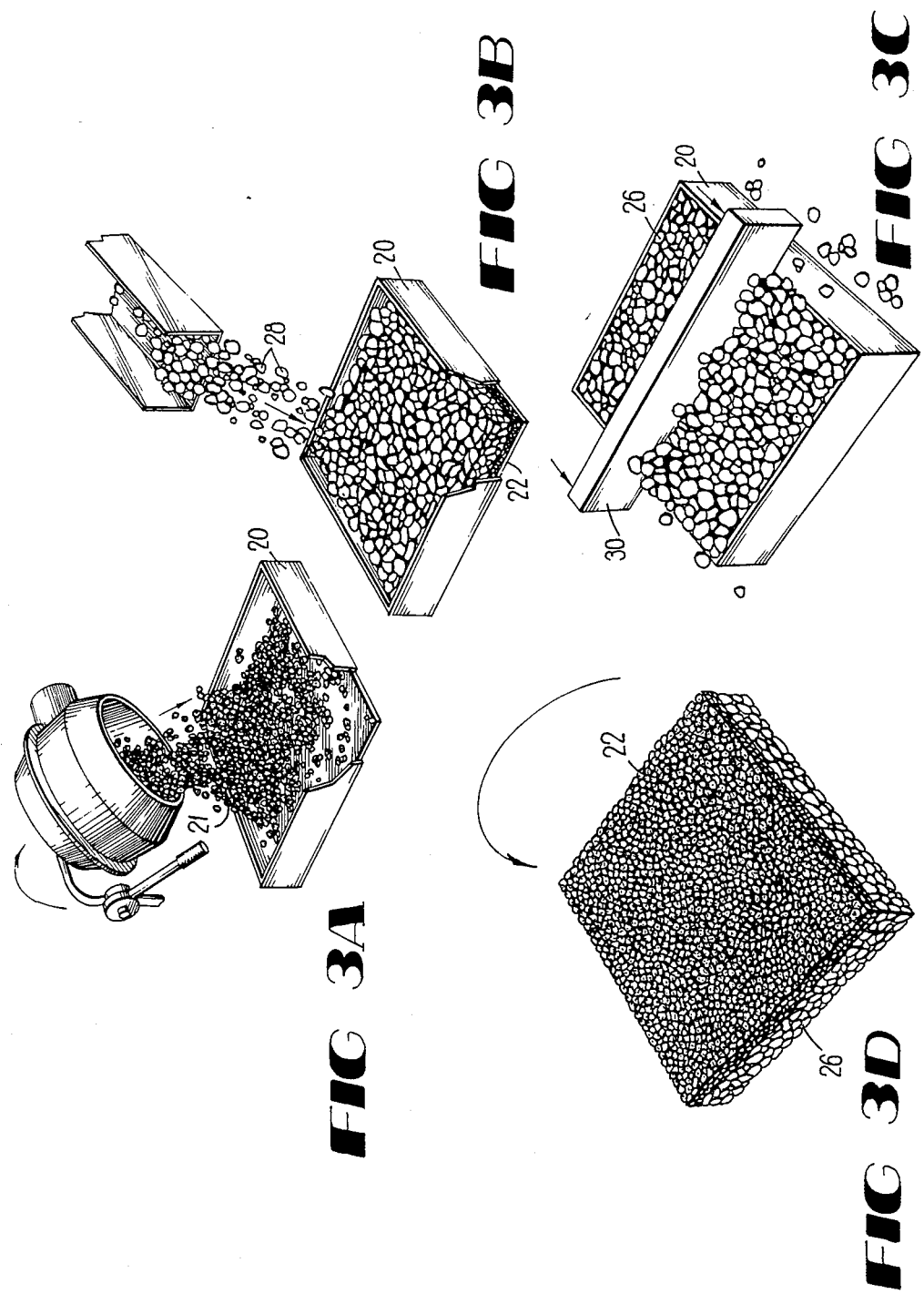

RIGID FILTER PLATE AND METHOD FOR PRODUCING SAME

BACKGROUND OF THE INVENTION

The present invention relates to filtration generally and is more particularly directed to the removal of particulate material from water or the separation of oil and water, and is even more particularly directed to a rigid filter plate or support plate which may be utilized in gravity sludge dewatering or oil and water separation.

It is frequently necessary to remove suspended or dissolved particulate matter from water. This is frequently characterized as a sludge treatment process, or sludge dewatering. Sludge dewatering is commonly employed in water treatment plants or similar industrial applications. Similar filtration may be used in waste water or raw water treatment to remove or separate oil from water.

In the most common applications, water is caused to be flowed over or through the filter material by gravity means. As water flows through the material, by contact with the filter means, sludge or particulate or other solids are removed from the water. Oil may be removed from the water by similar means.

Unless the filter material can be cleaned, it is necessary to dispose of the filter material once sludge or other materials have built up on or within the filter. It is not economically feasible in most settings, such as in waste water treatment plants, to constantly dispose of filters. Accordingly, there must be a reasonable means by which to clean these filters.

One method of cleaning filters is by back wash, or by flowing water in a backwards fashion through the filter so as to wash out the accumulated sludge or other materials. This is a time consuming means of cleaning the filters and may cause a loss of filter material, or breakage of the filter.

A preferred way of cleaning the filters is by a mechanical means of scraping the accumulated sludge or other material off of the filters. However, this means is abusive to teh filters, especially when it contemplated that heavy equipment such as small bulldozers or front end loaders may be accomplishing this mechanical cleaning. Therefore, a very durable filter is required for this type of cleaning to be employed.

It has long been recognized that sand is a very effective filtration material for sludge dewatering. However, in the prior art, sand has been employed by loosely placing it on top of or within some supporting or containing structure. Sand cannot be cleaned by the mechanical means described above, since such mechanical cleaning would take the sand with it.

The prior art reveals rigid filter plates using aggregate type materials which are bonded together, and which will allow mechanical cleaning to be accomplished due to their durable nature. However, the materials are bonded such that it is frequently necessary to employ vacuum means to achieve the desired water flow through the filter plate. Especially after sludge or other material which is removed from the water has built up on the plate, gravity will not achieve a satisfactory rate of flow through the filter plate due to the restrictions created by the filter materials and the sludge.

SUMMARY OF THE INVENTION

The present invention is a rigid filter plate which may be utilized in gravity sludge dewatering or oil and water separation, and which may be used with or without assisted backwash. Its durable and rigid nature allows it to be cleaned by mechanical means, and may be cleaned by backwash.

The present invention incorporates a lower layer of relatively larger material bonded together, covered by an upper layer of smaller material, which may be silica, which is blended with a smaller amount by volume of sand, and then bonded together.

The present invention shares in common with the prior art the use of two layers of stones or similar materials of varying sizes which are bonded together. The present invention further incorporates sand which is bonded to the smaller material located in the upper layer, producing an improved rigid filter plate as will be seen.

It has been recognized that sand has desirable properties as a filter material. However, in the prior art, sand has been used in a loose fashion, supported or contained within a supporting structure. Until the present invention, sand has not been used in the filtration process in conjunction with a rigid filter plate, or similar filtration device which may be cleaned by mechanical means.

The use of sand with the smaller material in the upper layer produces a superior filter plate in that it tends to space the material so as to eliminate the need for expensive vacuum assist. In the prior art, most of the sludge or material which is eliminated from the water accumulates within or on the upper layer consisting of the smaller material. Since the smaller material as used in the prior art is bonded together by adhesive means, the material butts together to achieve this bonding. As the sludge or material builds up within the upper plate, it is necessary to use vacuum assist equipment to achieve proper flow of water through the filter plate. The sand has the effect of spacing the smaller material and keeping it from butting together to the degree found in the prior art. This spacing allows better water flow through the material, eliminating the need for the vacuum equipment. Accordingly, while the sand aids in the filtration process, it also allows superior gravity flow of the water through the filter plate.

The present invention uses natural materials which are inexpensive and readily available. The method or process described herein for producing the filter plate is efficient, requires no special equipment, and may be easily performed.

DETAILED DESCRIPTION OF THE DRAWINGS

FIGS. 3A, 3B, 3C and 3D depict the steps of the method or process for producing the rigid filter plate. Sand is mixed with the smaller material 22, which may be silica, in the presence of an adhesive, with this mixture being placed into the mold 20 and grossly leveled, with the larger material 28 which has been mixed with an adhesive agent, placed over the smaller material. The material is then leveled 30, and after curing, is inverted for use.

DETAILED DESCRIPTION OF THE PREFERRED EMBODIMENT

The present invention is characterized by three distinct and separate sizes of materials contained in two layers, with the largest size of material making up the lower layer, and a smaller material having grains or particles of sand attached thereto making up the upper layer.

Figure 1:
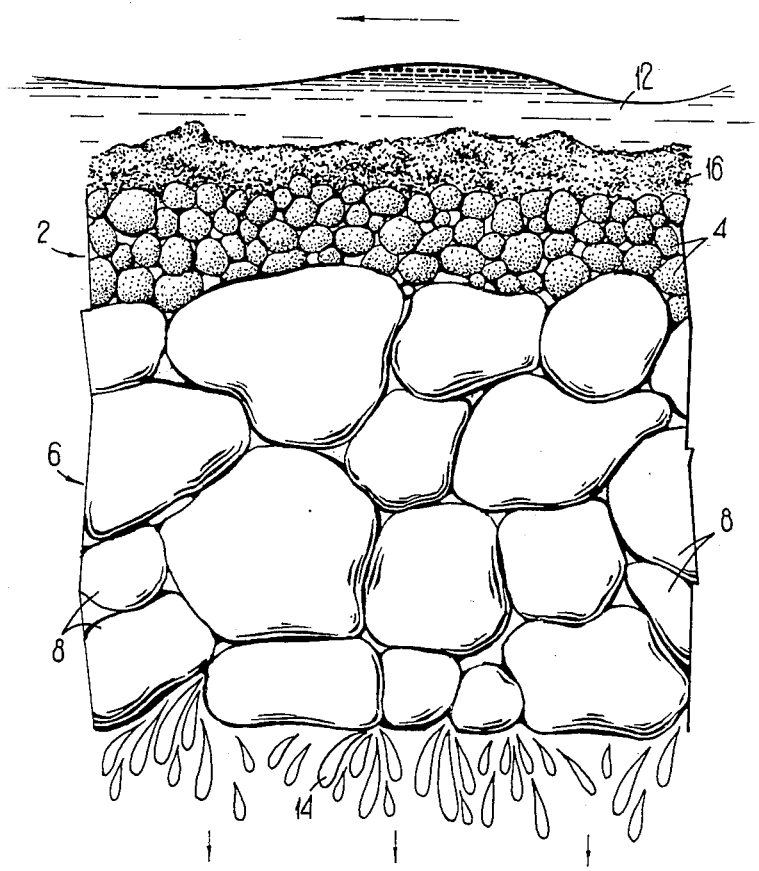
FIG. 1 is a section of the filter plate showing a liquid flowing over and through the filter plate, a build up of sludge which is removed from the liquid, and the two (2) layers which make up the filter plate, with the upper layer comprising relatively smaller material bonded together into sand, and the lower level being made up of relatively larger material which is bonded together.

FIG. 1 shows the makeup and operation of the invention. Two layers of the filter plate can be seen in FIG. 1, with the upper layer 2 being made up of smaller material 4 having sand bonded thereto, and the lower layer being made up of larger material. In the preferred embodiment, the lower layer 6 is made up of stone 8 of irregular size, but generally being of a size no larger than 1½ inches, and no smaller than ½ inch. In the preferred embodiment, this larger stone 8 is bonded together with epoxy by a process which will described herein. The stone could actually be any material having approximately the same size, hardness and corrosion resistance of stone, including ceramic or glass materials, or ferrous materials coated with epoxy or other corrosion retarding materials.

This material could be bonded together with any adhesive which will bond the particular material to be used in a fixed and permanent fashion.

The upper layer 2 is made up of smaller material 4 of irregular size, but generally being no larger than ¼ inch or smaller than ⅛ inch. In the preferred embodiment, this upper 2 layer is silica, which is permanently bonded with epoxy by the process which is described herein. In practice, the material which makes up the upper layer could be any material having approximately the same size, hardness and corrosion resistance as the silica, and which will allow bonding of sand to it as described herein. The material 4 may be bonded with any adhesive which will permanently bond the material in a fixed position.

Figure 2:
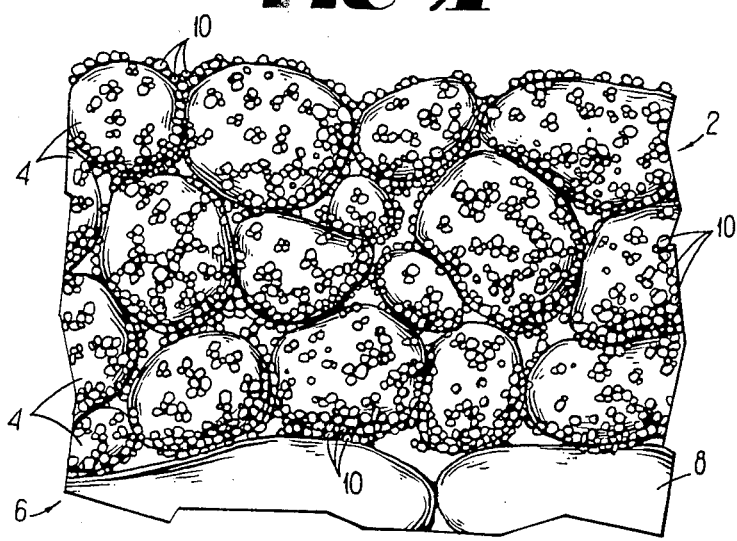
FIG. 2 shows an isolation of the relatively smaller material of the upper layer, with sand bonded to the relatively smaller material.

FIG. 2 is an isolation of the material 4 which makes up the upper layer 2, and depicts the sand 10 which is attached to the silica 4 of a size of ⅛ inch to ¼ inch so as to make up the upper layer 2. Sand 10 is mixed with the silica or substitute material in a ratio in the preferred embodiment of approximately one part sand by volume to twenty parts silica by volume. The sand 10 is mixed with the material 4 and epoxy before it is cured so as to achieve an homogenous mixture, and then the epoxy is allowed to cure as will be seen herein. Sand is considered to be any earth material that consists of loose grains of minerals or rocks larger than silt but smaller than gravel, with the individual grains being of a size greater than 1/400 inch (0.06 mm) but greater than 1/12 inch (2.1 mm). The grains or particles of sand 10 then stick to the individual silica 4 or substitute material 4 to produce what this inventor described as a cocklebur effect, with the sand 10 sticking from the silica 4 so as to produce hard, sharp pointed protrusions and which resembles the seed of the cocklebur plant.

Water or other liquid 12 to be processed is flowed over the top of the filter plate. As the water flows over the top of the filter plate, by gravity means, a portion of the water seeps into the filter plate. The water first travels through the upper layer 2, seeking its way through the relatively small passages produced by the smaller material 4 which makes up the upper layer 2 of the filter plate. The water continues to flow through the larger material which makes up the lower portion of the filter plate, and falls through the bottom of the filter plate as filtered water 14.

In this sludge dewatering process, sludge builds up on the top of the filter plate, with a small amount penetrating the extreme upper portion of the top layer of the filter plate. The sludge 16 build up is depicted in FIG. 1.

It is the upper layer 2 of the filter plate which primarily achieves the filtration of the effluent 12. The lower layer 6 aids in the filtration process, but is of importance in the solid base which it provides for the upper layer 2.

Accordingly, the improvement which the present invention provides is in the upper layer of the filter plate. Materials to be removed from the water or liquid are removed by contact with the silica or other material in the upper layer as the water or liquid seeks the relatively narrow passages which remain from the bonding of the silica or similar material to each other. As the sludge or other material builds up, it tends to participate in the filtration process, however, at some point the sludge build up reduces the flow of the water or other liquid through the filter to the extent that filters will allow so little water to pass that the rate of filtration becomes intolerable.

In the prior art, with multi-layer rigid filter plates, it has been necessary to use vacuum means to aid the flow of the affluent through the filter, as the sludge builds up on top of and within the filter.

The present invention provides a rigid filter plate in which this inventor has found that it is not necessary to use vacuum assist means. The filter achieves a satisfactory rate of gravity flow with only occassional back wash required, and without the necessity of expensive vacuum assist equipment. This desirable property is the result of the particular size of the materials selected by the inventor, and the use of the sand in conjunction with the silica mixing of the sand with the material of the upper layer. Rather than the material of the upper layer butting together and being held by adhesive as is found in the prior art, the sand aids in spacing the material so as to provide passages which achieve a superior water flow. At the same, the sand is present within these passages aids in removing the particulate, oil or other undesired material from the water.

To manufacture the filter plate described herein, the material 21 comprising the upper layer of the plate is first mixed together (FIG. 3A). In the preferred embodiment, silica of a size of ⅛ inch to ¼ inch is mixed together with sand in a ratio of approximately one part sand to twenty parts silica by volume. The sand and silica are mixed with epoxy until the mixture 21 is homogenous. This mixture 21 is then placed into a mold 20 which is preferrably square when viewed from the top, but which could be of other shapes if the application is so required. The mixture 21 which is to form the upper layer covers the mold so that it will produce an upper layer having a thickness of ¼ inch to 1 inch. This mixture, which will form the upper layer, is then grossly leveled. It is not necessary that the surface of the upper layer which will contact the surface of the lower layer. be leveled with particularity.

As set forth above, various materials can be used in place of silica. The ratio of and which is mixed with this material is approximately 1 to 20, but with experimentation other ratios could be used for particular applications. Any adhesive could be used which will bond the particular materials which form the upper layer, so long as the adhesive will produce a fast, hard and permanent bond between the materials and withstand mechanical cleaning. While various epoxies may be employed, the preferred epoxy is Exxon Escoweld 7500 epoxy grount, or its substitutes.

The material 28 which will form the lower layer 26 is then mixed with epoxy. This material 28 is preferably stone. This second mixture 28 which will form the lower layer 26 is then placed on top of the materials which will form the upper layer 22 of the filter plate (FIG. 3B). The mold 20 is prepared so that its height is equal to the desired height of the resultant filter plate. In the preferred embodiment, this height is approximately 3 ½ inches. The larger stone is of a size of ½ inch to 1½ inches, and is of irregular shape. After the epoxy and larger material which makes up the second mixture 28 is placed in the mold 20, the exposed surface is leveled. This leveling may be performed simply by dragging a straight edge, such as a board 30, across the top of the mold (FIG. 3c).

The epoxy or adhesive is allowed to cure. After the epoxy has cured, the filter plate is removed from the mold and inverted for use (FIG. 3D). Upper layer 22 and lower layer 26 as shown in FIG. 3 correspond to upper layer 2 and lower layer 6 as shown in FIGS. 1 and 2.

It has been found that the flow of the epoxy downward while the plate and epoxy are curing produces an unusually strong top portion of the filter plate after it is inverted for use due to the accumulation of epoxy near the top surface. Accordingly, the resulting plate is particularly resistant to damage from mechanical cleaning.

In use, the square shape allows the filter plates to be placed side by side, and the plates may be joined with the same epoxy which is used in the preparation of the filter plate. Accordingly, a field of filter plates may be produced so as to be able to process large volumes of liquid.

The plates may be resurfaced for additional service after they have become worn through use and cleaning. The top surface of layer 2 must be clean and dry. Material which is the same as material 4 is mixed with sand 10 and epoxy as described above. This material is then poured over the existing upper layer 2 and troweled or otherwise spread to an even thickness. To obtain a surface which is even more level, a tarp may be placed over the surface and then tamped flat using large sheets of wood, or leveled by a roller. The tarp may be made of polyethylene. An additional coating of epoxy may then be "painted" over the resurfaced layer after the layer has cured. This resurfacing material bonds effectively, and will withstand mechanical cleaning due to the downward flow of the epoxy during the original manufacture as described above, making more epoxy present near the top of the upper layer 2, and taking advantage of the tendency of this epoxy to bond to itself.

The present invention produces a rigid filter plate which may be cleaned by mechanical means such as heavy equipment. It is superior to multiple layer rigid filter plates as found in the prior art in its use of three materials within two layers, rather than two differing sizes of materials as is found in the prior art. The invention allows the use of sand, which is known to be an effective filtration material, in conjunction with a rigid filter plate, which is not heretofore been recognized in the prior art. This use of sand produces a spearing effect upon the material to be removed from the water. At the same time, the resulting filter can be used effectively without the need for vacuum equipment, due to the spacing of the material in the upper layer achieved by the sand which produces superior passages through which the water or liquid can travel.

What is claimed is:

1. A rigid sludge or oil separation filter plate, comprising:
   (a) an upper layer of silica of ⅛ to ¼ inches in size bonded together by adhesive means, and having a smaller amount by volume of sand having grains of a size of 1/400 inches to 1/12 inches homogenously interspersed therein, and bonded to said silica by said adhesive means; and
   (b) a lower layer of stone of a size which is larger than that of said silica, with said stone bonded together by adhesive means.

2. A rigid sludge or oil separation filter plate, as described in claim 1, wherein said stone is ½ to 1½ inches in size.

3. A rigid sludge or oil separation filter plate, as described in claim 1, wherein the ratio of sand to silica by volume is approximately 1 part sand to 20 parts silica.

4. A rigid sludge or oil separation filter plate, as described in claim 2, wherein the ratio of sand to silica by volume is approximately 1 part sand to 20 parts silica.

5. A method of resurfacing a rigid sludge or oil separation filter plate of the type described in claim 1, comprising the steps of:
   (a) producing a resurfacing mixture by homogenously mixing silica of a size of ⅛ inch to ¼ inch, sand having grains of 1/400 inches to 1/12 inches in size and adhesive;
   (b) applying said resurfacing mixture to a top surface of the filter plate; and
   (c) leveling said resurfacing mixture.

6. A method of resurfacing a rigid sludge or oil separation filter plate of the type described in claim 2, comprising the steps of:
   (a) producing a resurfacing mixture by homogenously mixing silica of a size of ⅛ inch to ¼ inch, sand having grains of 1/400 inches to 1/12 inches in size and adhesive;
   (b) applying said resurfacing mixture to a top surface of the filter plate; and
   (c) leveling said resurfacing mixture.

7. A method of resurfacing a rigid sludge or oil separation filter plate of the type described in claim 3, comprising the steps of:
   (a) producing a resurfacing mixture by homogenously mixing silica of a size of ⅛ inch to ¼ inch, sand having grains of 1/400 inches to 1/12 inches in size and adhesive;
   (b) applying siad resurfacing mixture to a top surface of the filter plate; and
   (c) leveling said resurfacing mixture.

8. A method of resurfacing a rigid sludge or oil separation filter plate of the type described in claim 4, comprising the steps of:
   (a) producing a resurfacing mixture by homogenously mixing silica of a size of ⅛ inch to ¼ inch, sand having grains of 1/400 inches to 1/12 inches in size and adhesive;
   (b) applying said resurfacing mixture to a top surface of the filter plate; and
   (c) leveling said resurfacing mixture.

* * * * *